(12) United States Patent
Shirai

(10) Patent No.: US 8,155,171 B2
(45) Date of Patent: Apr. 10, 2012

(54) MULTIPATH SIGNAL JUDGING METHOD, PROGRAM, AND MULTIPATH SIGNAL JUDGING DEVICE

(75) Inventor: Tsubasa Shirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 659 days.

(21) Appl. No.: 12/338,387

(22) Filed: Dec. 18, 2008

(65) Prior Publication Data

US 2009/0168925 A1 Jul. 2, 2009

(30) Foreign Application Priority Data

Dec. 26, 2007 (JP) ................................ 2007-334582

(51) Int. Cl.
*H04B 1/707* (2006.01)
(52) U.S. Cl. ........................................................ 375/147
(58) Field of Classification Search .................. 375/142, 375/147, 150
See application file for complete search history.

(56) References Cited

U.S. PATENT DOCUMENTS
2002/0186794 A1* 12/2002 Oesch et al. .................. 375/340

FOREIGN PATENT DOCUMENTS
JP 2000-312163 A 11/2000
* cited by examiner

*Primary Examiner* — Kevin Kim
(74) *Attorney, Agent, or Firm* — Global IP Counselors, LLP

(57) ABSTRACT

A multipath signal judging method includes: performing correlation calculation for I and Q components for a reception signal as a positioning signal modulated in a spread code and a replica code; judging code phase based on the correlation calculation; calculating an angle formed by position vectors of correlation values at advanced phase and delayed phase from the code phase in advanced and delayed directions by N chip (0<N<1) plotted on IQ coordinates; and judging whether the reception signal is multipath signal using the angle.

8 Claims, 13 Drawing Sheets

FLAG JUDGMENT RANGE TABLE                452

| GPS SATELLITE | JUDGMENT RANGE A (FLAG F1) | | JUDGMENT RANGE B (FLAG F2) | | JUDGMENT RANGE C (FLAG F3) | |
|---|---|---|---|---|---|---|
| | CENTER VALUE | WIDTH | CENTER VALUE | WIDTH | CENTER VALUE | WIDTH |
| #1 | 4 | 6 | 110 | 20 | 110 | 20 |
| #2 | 1 | 6 | 125 | 20 | 125 | 20 |
| #3 | 8 | 6 | 118 | 20 | 118 | 20 |
| ⋮ | ⋮ | ⋮ | ⋮ | ⋮ | ⋮ | ⋮ |

PE OFFSET TABLE
| GPS SATELLITE | PE OFFSET |
|---|---|
| #1 | 85 |
| #2 | 79 |
| #3 | 82 |
| ⋮ | ⋮ |
FIG.14
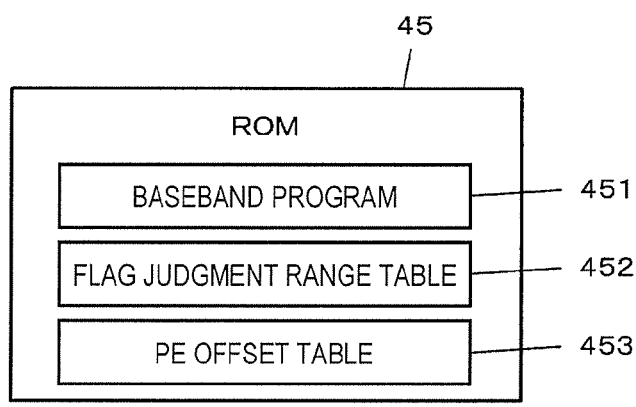
FIG.15
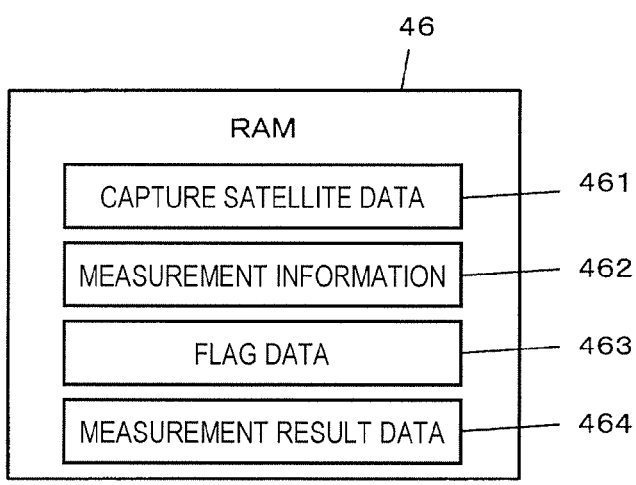
FIG.16

MULTIPATH SIGNAL JUDGING METHOD, PROGRAM, AND MULTIPATH SIGNAL JUDGING DEVICE

Japanese Patent Application No. 2007-334582 filed on Dec. 26, 2007, is hereby incorporated by reference in its entirety.

BACKGROUND

1. Technical Field

The present invention relates to a multipath signal judging method and others for judging whether a receiving signal is a multipath signal or not.

2. Related Art

GPS (global positioning system) is widely known as positioning system using positioning signals, and applied to positioning device contained in cellular phone, car navigation system and the like. According to the GPS, the current position of the positioning device is determined through positioning calculation which obtains four parameters of three-dimensional coordinates showing the position of the positioning device and time error based on information about positions of plural GPS satellites and pseudo distances between the respective GPS satellites and the positioning device.

Multipath is one of the chief factors which cause errors in position measurement using measuring signals. The environment where multipath is generated is referred to as multipath environment. In the multipath environment, multipath signals produced by superimposing indirect waves such as reflection waves reflected by buildings, ground or the like, transmissive waves transmitted through obstacles, and diffraction waves diffracted through obstacles on direct waves transmitted from a signal generating source (GPS satellites in case of GPS) are received. Under this environment, indirect waves become error signals, making it difficult to decode codes.

Various technologies for reducing the effect of multipath have been proposed. For example, a method disclosed in JP-A-2000-312163 performs correlation calculation between a reception signal and plural replica codes of C/A codes having different phases for each chip. Then, the phase range where the correlation value is expected to become the peak value is calculated. Subsequently, correlation calculation between the reception signal and plural replica codes having different phases for each 0.1 chip is performed to detect code phase.

However, it is generally difficult to judge whether the reception signal is multipath signal or not. Thus, a so-called preventive method is usually employed which reduces the effect on the position measurement calculation without judging whether the reception signal is multipath signal or not even when the signal is multipath signal. For example, the technology disclosed in JP-A-2000-312163 is a method for detecting appropriate code phase even when the reception signal is multipath signal. In this structure, various disadvantages such as increase in the calculation volume and the circuit scale are provided when this preventive method is employed under the present situation.

SUMMARY

It is an advantage of some aspects of the invention to provide a multipath signal judging method, a program, and a multipath signal judging device capable of solving the problems described above.

A multipath signal judging method according to a first aspect of the invention includes: performing correlation calculation for I and Q components of a reception signal as a positioning signal modulated in a spread code and a replica code; judging code phase based on the correlation calculation; calculating an angle formed by position vectors of correlation values at advanced phase and delayed phase from the code phase in advanced and delayed directions by N chip (0<N<1) plotted on IQ coordinates; and judging whether the reception signal is multipath signal using the angle.

A multipath signal judging device according to a second aspect of the invention includes: a correlation calculating unit which performs correlation calculation for I and Q components of a reception signal as a positioning signal modulated in a spread code and a replica code; a code phase judging unit which judges code phase based on the correlation calculation; an angle calculating unit which calculates an angle formed by position vectors of correlation values at advanced phase and delayed phase from the code phase in advanced and delayed directions by N chip (0<N<1) plotted on IQ coordinates; and a multipath signal judging unit which judges whether the reception signal is multipath signal using the angle.

When the reception signal is not multipath signal (i.e., direct wave signal), the angle formed by the position vectors of correlation values at the advanced phase and delay phase plotted on the IQ coordinates becomes a constant value (theoretically zero) as will be described in detail in the following embodiment. When the reception signal is multipath signal, the angle varies in the manner similar to sin waves. Thus, whether the reception signal is multipath signal can be determined by judging variations in the "angle formed by two position vectors".

A multipath signal judging method according to a third aspect of the invention includes: calculating a ratio of a first correlation value for a third correlation value to a second correlation value for the third correlation value, the first correlation value as correlation value at the code phase, the second correlation value as correlation value at a phase shifted from the code phase by X chip (0<X<1), and the third correlation value as correlation value at a phase shifted from the code phase by Y chip (1<Y); wherein, the judging of whether the reception signal is multipath signal judges whether the reception signal is multipath signal using the angle and the ratio.

A multipath signal judging device according to a fourth aspect of the invention includes: a ratio calculating unit that calculates a ratio of a first correlation value for a third correlation value to a second correlation value for the third correlation value, the first correlation value as correlation value at the code phase, the second correlation value as correlation value at a phase shifted from the code phase by X chip (0<X<1), and the third correlation value as correlation value at a phase shifted from the code phase by Y chip (1<Y); wherein, the judging of whether the reception signal is multipath signal judges whether the reception signal is multipath signal using the angle and the ratio.

When the reception signal is not multipath signal (i.e., direct wave signal), the angle formed by the position vectors of the correlation values at the advanced phase and delayed phase plotted on the IQ coordinates becomes a constant value (theoretically zero) as will be described in detail in the following embodiment. When the reception signal is multipath signal, the angle varies in the manner similar to sin waves. When the reception signal is direct wave signal, the ratio of the first correlation value for the third correlation value to the second correlation value for the third correlation value becomes a constant value according to spread codes. When the reception signal is multipath signal, the ratio varies in the manner similar to sin waves. Thus, whether the reception signal is multipath signal can be determined by judging variations in the "angle formed by two position vectors" and the "ratio of the two correlation values".

It is preferable that the judging of whether the reception signal is the multipath signal including: the judging of whether the reception signal is the multipath signal including: judging whether the angle exceeds a predetermined angle variation width or not; judging whether the ratio exceeds a predetermined ratio variation width or not; and judging that the reception signal is the multipath signal when the angle exceeds the predetermined angle variation width and when the ratio exceeds the predetermined ratio variation width in the multipath signal judging method according to the aspect of the invention.

According to this structure, the reception signal is judged as multipath signal when the angle formed by the two position vectors exceeds the predetermined angle variation width and when the ratio of the two correlation values exceeds the predetermined ratio variation width.

It is preferable that the positioning signal is transmitted from a positioning satellite and has a different spread code for each of the positioning satellite in the multipath signal judging method. In this case, either or both of the predetermined angle variation width and the predetermined ratio variation width are changed for each of the positioning satellite.

According to this structure, the positioning signal is transmitted from a positioning satellite and has a different spread code for each of the positioning satellite, and either or both of the predetermined angle variation width and the predetermined ratio variation width are changed for each of the positioning satellite. When the spread codes are different, the angle formed by the two position vectors and the ratio of the two correlation values differ in case of the reception signal which is not multipath signal in some cases. Thus, judgment of multipath signal can be made with higher accuracy by varying the angle variation width and the ratio variation width for each positioning satellite.

It is preferable that the judging of whether the reception signal is the multipath signal including: judging of whether the angle exceeds a predetermined angle variation width or not; judging of whether the ratio exceeds a first ratio variation width or not; and judging of whether the ratio exceeds a second ratio variation width having threshold condition wider than the first ratio variation width or not; and judging of that the reception signal is the multipath signal 1) when the angle exceeds the predetermined angle variation width and when the ratio exceeds the first ratio variation width, or 2) when the ratio exceeds the second ratio variation width in the multipath signal judging method.

According to this structure, the reception signal is judged as the multipath signal 1) when the angle formed by the two position vectors exceeds the predetermined angle variation width and when the ratio of the two correlation values exceeds the first ratio variation width, or 2) when the ratio of the two correlation values exceeds the second ratio variation width having threshold condition wider than the first ratio variation width.

It is preferable that the positioning signal is transmitted from a positioning satellite and has a different spread code for each of the positioning satellite in the multipath signal judging method. In this case, at least one of the predetermined angle variation width, the first ratio variation width, and the second ratio variation width is changed for each of the positioning satellite.

According to this structure, the positioning signal is transmitted from a positioning satellite and has a different spread code for each of the positioning satellite in the multipath signal judging method, and at least one of the predetermined angle variation width, the first ratio variation width, and the second ratio variation width is changed for each of the positioning satellite. When the spread codes are different, the angle formed by the two position vectors and the ratio of the two correlation values differ in case of the reception signal which is not multipath signal in some cases. Thus, judgment of multipath signal can be made with higher accuracy by varying the angle variation width and the first and second ratio variation widths for each positioning satellite.

A multipath signal judging method according to a fifth aspect of the invention includes: performing correlation calculation for I and Q components of a reception signal as a positioning signal modulated in a spread code and a replica code; judging code phase based on the correlation calculation; calculating a ratio of a first correlation value for a third correlation value to a second correlation value for the third correlation value, the first correlation value as correlation value at the code phase, the second correlation value as correlation value at a phase shifted from the code phase by X chip ($0<X<1$), and the third correlation value as correlation value at a phase shifted from the code phase by Y chip ($1<Y$); and judging whether the reception signal is multipath signal using the ratio.

A multipath signal judging device according to a sixth aspect of the invention includes: a correlation calculating unit that performs correlation calculation for I and Q components of a reception signal as a positioning signal modulated in a spread code and a replica code; a code phase judging unit that judges code phase based on the correlation calculation; a ratio calculating unit that calculates a ratio of a first correlation value for a third correlation value to a second correlation value for the third correlation value, the first correlation value as correlation value at the code phase, the second correlation value as correlation value at a phase shifted from the code phase by X chip ($0<X<1$), and the third correlation value as correlation value at a phase shifted from the code phase by Y chip ($1<Y$); and a multipath signal judging unit that judges whether the reception signal is multipath signal using the ratio.

As will be described in detail in the following embodiment, the ratio of the first correlation value for the third correlation value to the second correlation value for the third correlation value is constant when the reception signal is direct wave signal and varies in the manner similar to sin waves when the reception signal is multipath signal. Thus, whether the reception signal is multipath signal can be determined by judging variation in the "ratio of the two correlation values".

A computer-readable-medium stored a program according to a seventh aspect of the invention under which a processor contained in a positioning device performs any of the multipath signal judgment methods described above.

According to this program, operation and advantage similar to those of the methods or devices described above can be offered by the program read and performed by the processor.

BRIEF DESCRIPTION OF THE DRAWINGS

The invention will be described with reference to the accompanying drawings, wherein like numbers reference like elements.

FIG. 14 shows an example of data structure of PE offset table.

FIG. 15 shows an example of ROM structure.

FIG. 16 shows an example of RAM structure.

DESCRIPTION OF EXEMPLARY EMBODIMENT

A preferred embodiment according to the invention is hereinafter described with reference to the drawings. In the following example, a cellular phone having GPS positioning function will be discussed, but the invention is not limited to this example.

Principle (A) Judgment of Multipath Signal

Initially, a method for judging whether a reception signal is multipath signal or not is described. According to a GPS receiving device, a GPS satellite signal as a positioning signal transmitted from a GPS satellite as positioning satellite is captured using spread codes called C/A codes. More specifically, the GPS satellite signal is modulated by spread using C/A codes as spread codes. Then, correlation calculation between the reception signal of the GPS satellite signal and the replica codes which simulate the C/A codes of the GPS satellite signal (capture target satellite signal) from the GPS satellite (capture target satellite) as the target of capture is performed. This correlation calculation is carried out while shifting the frequency and phase of the replica codes. The correlation value obtained by correlation calculation becomes the maximum when the frequency of the replica codes agrees with the frequency of the reception signal and when the phase of the replica codes agrees with the phase of the reception signal. The phase of the C/A codes and carrier wave frequency (Doppler frequency) contained in the GPS satellite signal are obtained through detection of the phase and frequency at which the correlation value becomes the maximum, and the GPS satellite signal is thus captured. The C/A codes have different codes specified for each GPS satellite in advance. Thus, a desired GPS satellite signal can be separated and captured from the reception signal. When the maximum correlation value does not reach a fixed value, the correlation value is not judged as peak value. In this case, the reception signal is not judged as capture target satellite signal. Then, correlation calculation is performed for other capture target satellite signals.

The GPS satellite constantly changes its position, and the distance between the GPS satellite and the GPS receiving device (pseudo distance) changes accordingly. Thus, for dealing with the variations in the pseudo distance, the GPS receiving device executes tracking process for tracking the captured GPS satellite signal.

Figure 1A:
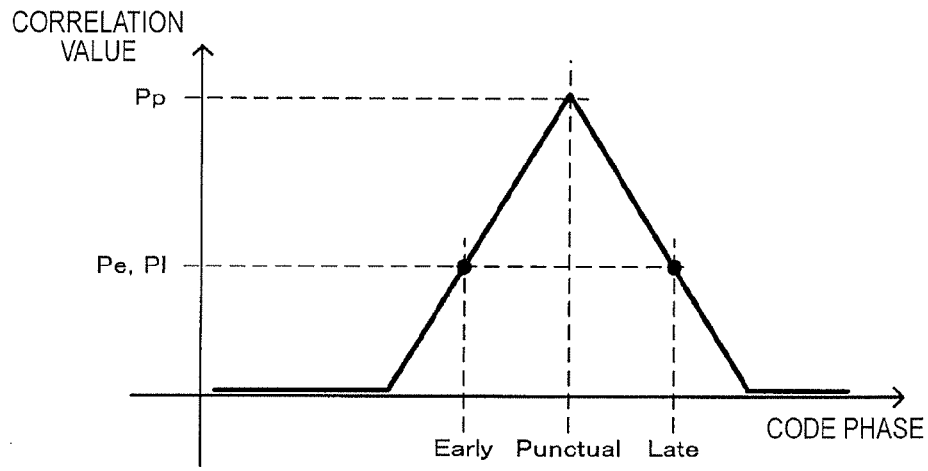
FIGS. 1A through 1C show peak detection of correlation values.
Figure 1B:
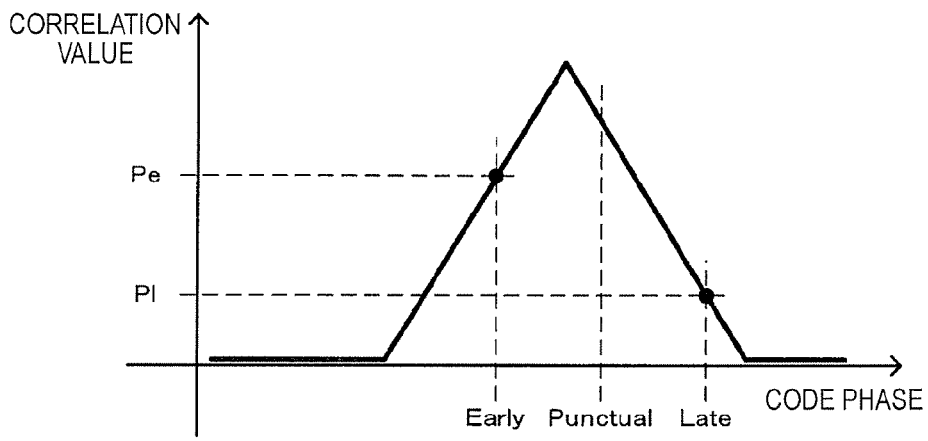
Figure 1C:
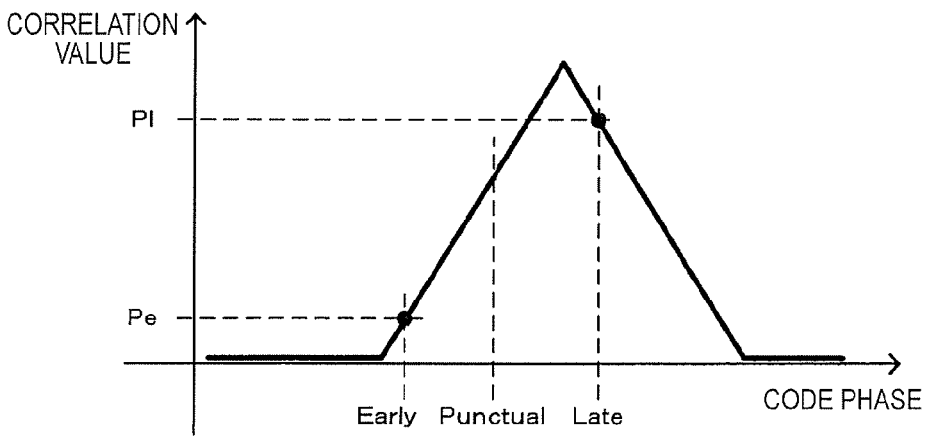

FIGS. 1A through 1C show detection of phase (peak phase) at which the correlation value becomes the maximum (peak). These figures illustrate an example of self-correlation value of C/A codes, showing code phases on the horizontal axis and correlation values on the vertical axis. As shown in the figures, the self-correlation values of C/A codes are represented by a substantially symmetrical triangular shape having the peak value at the top. Thus, the correlation value at the phase delayed from the peak phase and that at the phase advanced from the peak phase by the same amount are equivalent to each other.

Accordingly, the correlation value at the phase (early phase) advanced by a fixed amount (such as ⅓ chip) from the code phase (punctual phase) as the currently tracking target and the phase (late phase) delayed therefrom by this amount is calculated. Then, the punctual phase is controlled such that a correlation value Pl at the late phase (late correlation value) and a correlation value Pe at the early phase (early correlation value) become equal to each other. More specifically, when the early phase value Pe agrees with the late correlation value Pl as shown in FIG. 1A, it is considered that a punctual phase Pp coincides with the peak phase. When the early correlation value Pe is larger than the late correlation value Pl as shown in FIG. 1B, the punctual phase is delayed from the peak phase. In this case, the punctual phase is advanced. When the early correlation value Pe is smaller than the late correlation value Pl as shown in FIG. 1C, the punctual phase is advanced from the peak phase. In this case, the punctual phase is delayed.

In the multipath environment, the signal received by the GPS receiving device (reception signal) is a signal (multipath signal) produced by superimposing an indirect wave signal such as reflection waves reflected by buildings, ground or the like, transmissive waves transmitted through obstacles, and diffraction waves diffracted through obstacles on a GPS satellite signal (direct wave signal) transmitted from a GPS satellite.

Figure 2:
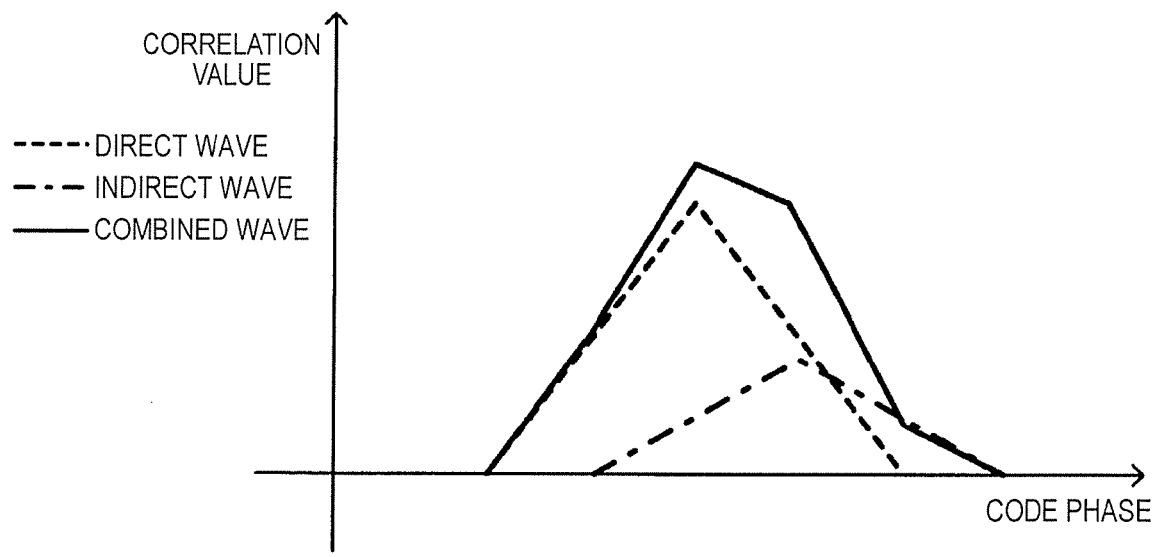
FIG. 2 shows an example of a correlation result of a multipath signal.
Figure 3:
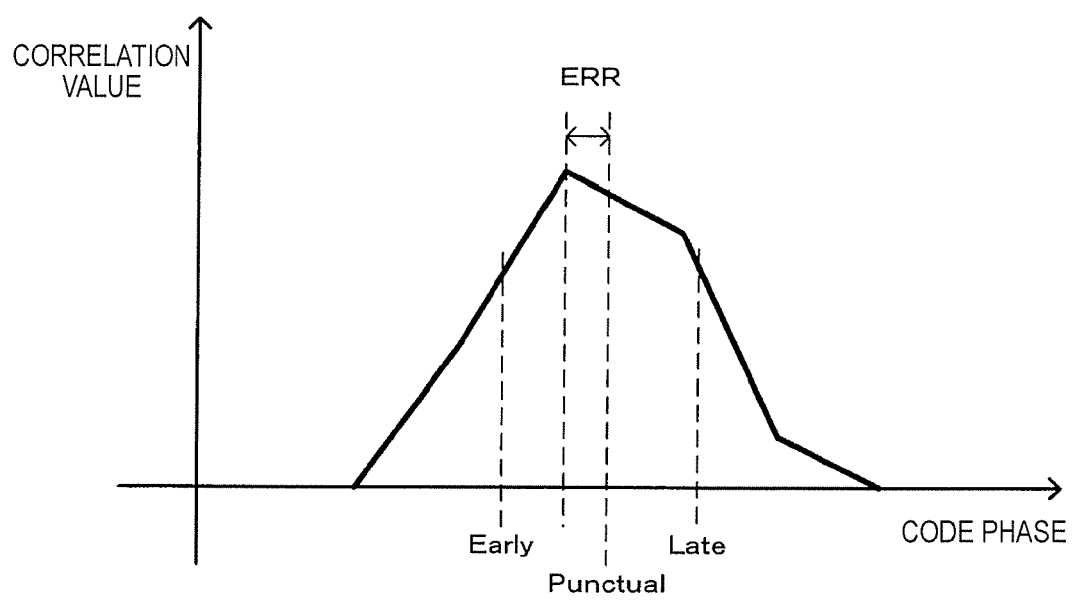
FIG. 3 shows error ERR.

FIG. 2 shows correlation result of a multipath signal as a graph showing correlation values of direct wave signal, indirect wave signal, and multipath signal produced by combining (superimposing) direct wave signal and indirect wave signal. As shown in the figure, the correlation values of the indirect wave signal form a substantially triangular shape similarly to the correlation values of the direct wave signal. However, the peak value of the correlation values (correlation peak value) of the indirect wave signal is smaller than the correlation peak value of the direct wave signal. This is because the signal intensity of the GPS satellite signal transmitted from the GPS satellite is lowered while reflected by buildings or ground or transmitted through obstacles. Also, the peak phase of the indirect wave signal is delayed from the peak phase of the direct wave signal. This is because the transmission route from the GPS satellite to the GPS receiving device is extended by reflection of the GPS satellite signal transmitted from the GPS satellite by buildings or ground, diffraction of the GPS satellite signal through obstacles, or for other reasons. Since the correlation of the multipath signal is the sum of the correlation value of the direct wave signal and the correlation value of the indirect wave signal, the triangular shape is distorted and becomes asymmetric with respect to the peak value as the center. As a result, the punctual phase of the multipath signal does not agree with the peak phase as shown in FIG. 3. The phase difference between the peak phase and the punctual phase is hereinafter referred to as "error ERR". The indirect wave signal has delay phase from that of the direct wave signal, and the correlation peak value of the indirect wave signal is smaller than the correlation peak value of the direct wave signal. Thus, the punctual phase becomes delay phase from the peak phase.

In this embodiment, two parameters "PE value" and "vector angle" are defined, and it is judged whether the reception signal is multipath signal or not based on these parameters. In addition, the error ERR of the code phase is calculated to correct the code phase obtained by signal capture and tracking.

Figure 4:
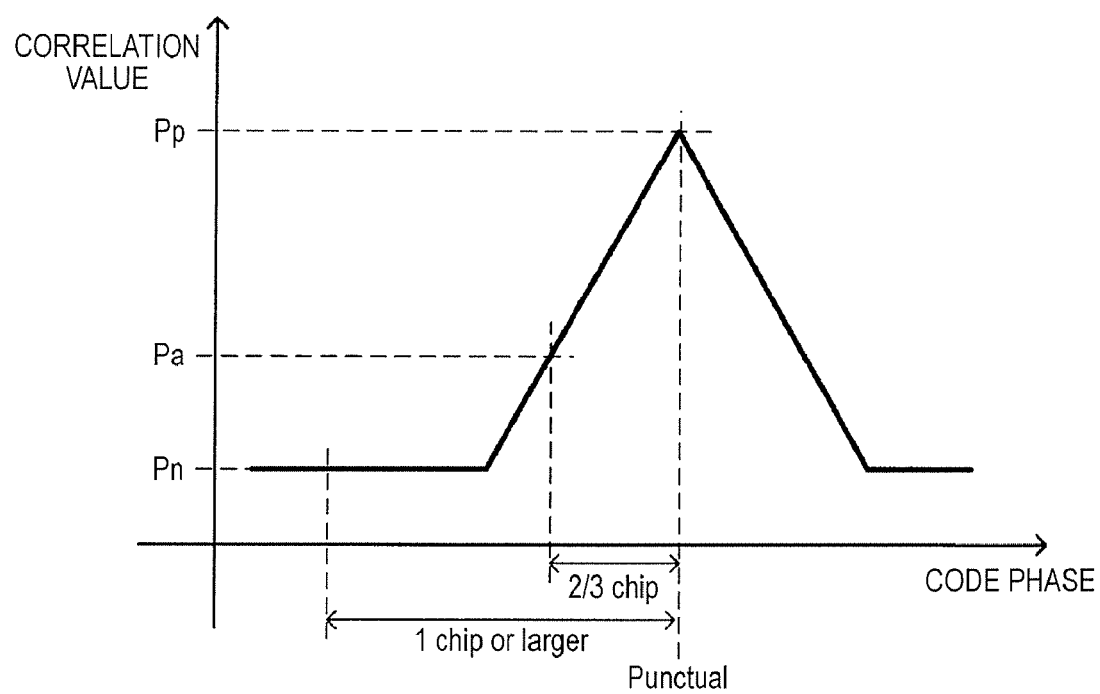
FIG. 4 shows definition of PE value.

FIG. 4 shows definition of the PE value in an example of the correlation result of the reception signal. As illustrated in this figure, the PE value is defined by equation (1) based on the correlation value Pp of the punctual phase (punctual correlation value), a correlation value Pn at a phase advanced from the punctual phase by 1 chip or larger, and a correlation value Pa at a code phase advanced from the punctual phase by N chip. The N value lies in the range of 0<N<1, and the example in the figure shows the case of N=⅔. That is, the PE value represents the ratio of the punctual correlation value Pp for the correlation value Pn to the correlation value Pa for the correlation value Pn. The correlation value Pn as a correlation value at a phase away from the punctual phase by 1 chip or larger can be considered as a correlation value of noise floor.

$$PE=(Pp-Pn)/(Pa-Pn) \quad (1)$$

Figure 5:
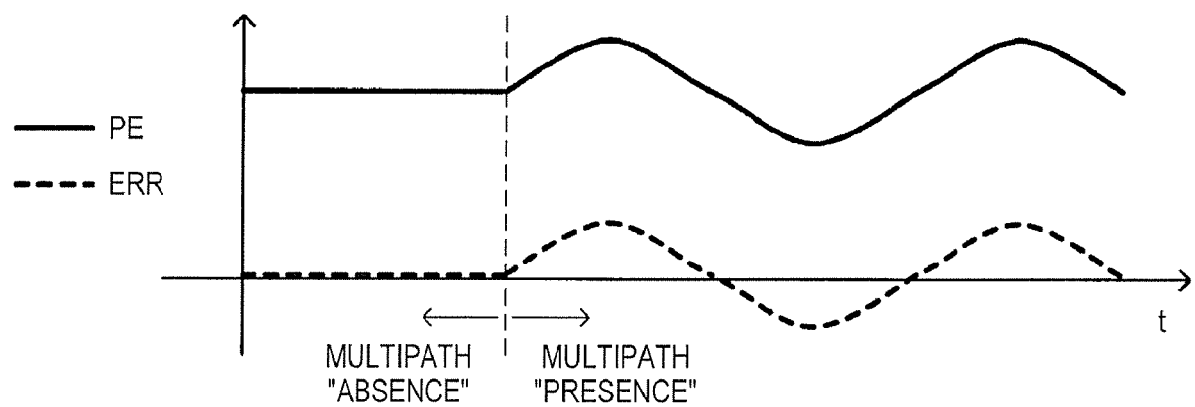
FIG. 5 shows the relationship between the PE value and the error ERR.

The PE value and the error ERR have a relationship described herein. FIG. 5 shows the relationship between the PE value of the reception signal and the error ERR when the effect of the multipath changes from "absence" to "presence". In this figure having the horizontal axis as a common time axis, a solid line indicates PE values with elapse of time, and a broken line indicates error ERR with elapse of time.

As can be seen from the figure, the reception signals received by the GPS receiving device are only direct wave signals under the condition of "absence" of the effect of multipath. In this case, the error ERR becomes substantially zero, and the PE value is a constant value. This is because the curved shape of the correlation value of the direct wave signal does not change with elapse of time. However, the inclination of the triangle differs according to PRN codes, and the PE value varies according to GPS satellites.

On the other hand, under the condition of "presence" of the effect of multipath, the reception signals become multipath signals produced by superimposing indirect wave signals on direct wave signals. In this case, the error ERR and the PE value vary with elapse of time. This is caused by the change of indirect wave signals according to the change of the relative position relationship between the GPS satellite signal and the GPS receiving device with shift of the GPS satellite and the GPS receiving device. As a result, the curved shape of the correlation value of the multipath signal varies. That is, the error ERR and the PE value vary since the correlation values Pp and Pa of the reception signal shown in FIG. 4 change. The fluctuations in the PE value can be approximated by sin waves, and the amplitude is determined by the signal intensity relationship between the direct wave signal and the indirect wave signal and the difference in carrying frequencies. The PE value and the error ERR vary with elapse of time substantially in the same manner. More specifically, the PE value increases as the error ERR increases, and the PE value decreases as the error ERR decreases.

Figure 6A:
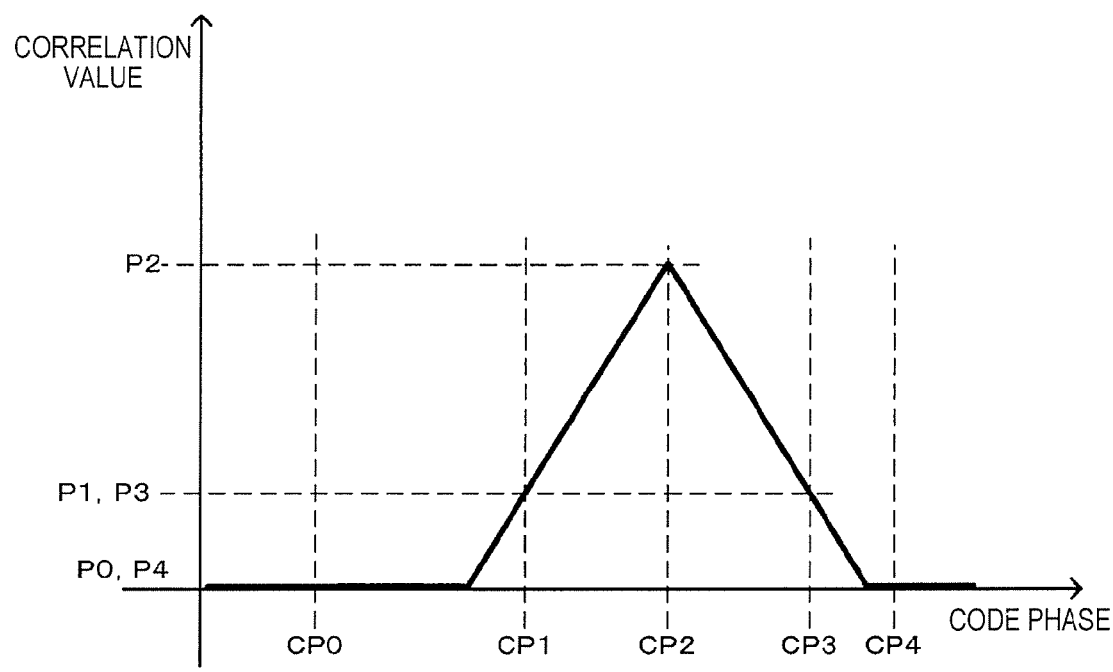
FIGS. 6A and 6B show an example of a correlation result of a direct wave signal.
Figure 6B:
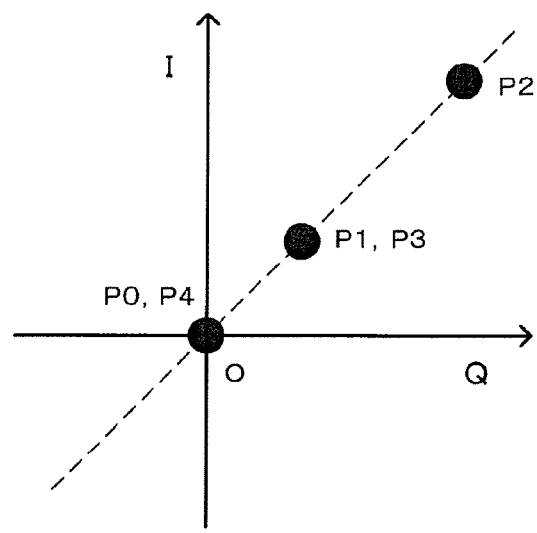

The vector angle is defined in the following manner. FIGS. 6A and 6B show the correlation result of the direct wave signal. FIG. 6A is a graph showing the correlation value relative to the code phase of the direct wave signal, and FIG. 6B is a graph on which correlation values P at the respective code phases shown in FIG. 6A are plotted on IQ coordinate plane which has the horizontal axis indicating Q components of the correlation values and the vertical axis indicating I components of the correlation values. The correlation value P is expressed as $P=\sqrt{(I^2+Q^2)}$. As can be seen from FIG. 6B, the correlation value P of the direct wave signal is distributed substantially along a line passing the origin O on the IQ coordinate plane. More specifically, the I components and Q components of correlation values P0 and P4 at code phases CP0 and CP4 are both zero, and plotted at the origin O on the IQ coordinate plane. The I components and Q components of correlation values P1 through P3 at the code phases CP1 through CP3 are not zero, and thus plotted at positions away from the origin O. Particularly the correlation value P2 at the code phase (peak phase) CP2 at which the correlation value P becomes the maximum is plotted at the furthermost position from the origin O. More specifically, the correlation values P from the phase CP0 advanced from the peak phase CP2 by 1 chip or more to the phase CP4 delayed from the peak phase CP2 by 1 chip or more shift away from the origin O on the IQ coordinate plane in the negative to positive direction of the code phase, and reach the furthermost position at the peak phase. Then, the correlation values P again return to the origin O, leaving substantially linear trace. In the example shown in the figure, the substantially linear trace has an angle of about 45 degree to the Q axis. However, this angle varies according to the phase of the carrier waves of the direct wave signal, the method of determining the IQ coordinates, and other conditions.

Figure 7A:
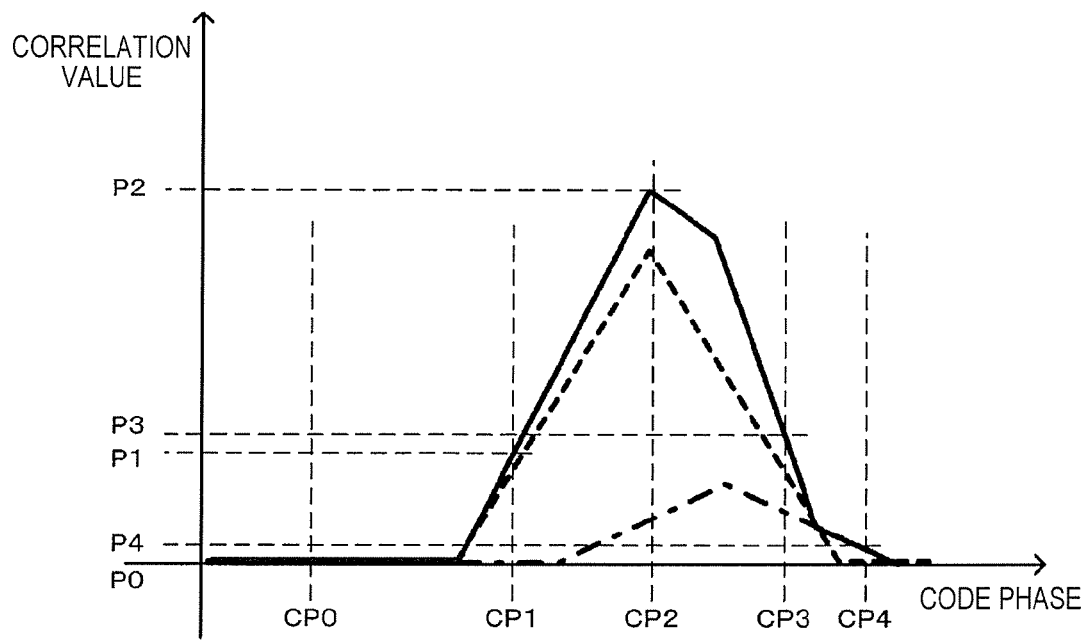
FIGS. 7A and 7B show an example of a correlation result of a multipath signal.
Figure 7B:
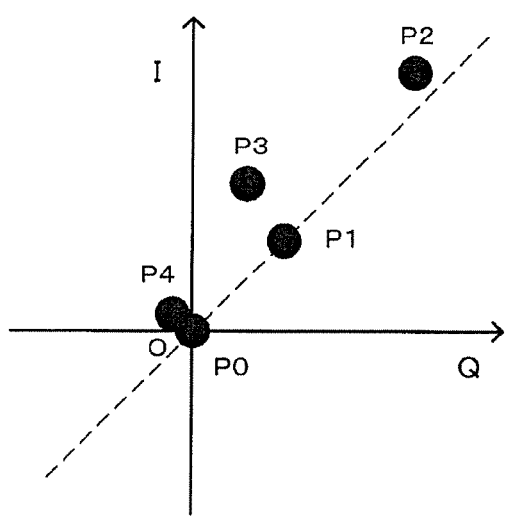

FIGS. 7A and 7B show the correlation results of the multipath signal produced by combining direct wave signal and indirect wave signal shown in FIGS. 2 and 3. FIG. 7A is a graph showing correlation value at the code phase of multipath signal, and FIG. 7B shows correlation values of respective code phases shown in FIG. 7A plotted on IQ coordinate plane. As shown in FIG. 7B, the correlation value P of the multipath signal is distributed such that a closed curved trace can be produced on the IQ coordinate plane. More specifically, the I component and Q component of correlation value P0 at the code phase CP0 are both zero, and plotted at the origin O on the IQ coordinate plane. The I components and Q components of correlation values P1 through P4 at the code phases CP1 through CP4 are not zero, and thus plotted at positions away from the origin O. Particularly the correlation value P2 at the peak phase CP2 is plotted at the furthermost position from the origin O. More specifically, the correlation values P of the multipath signal shift away from the origin O on the IQ coordinate plane, and reach the furthermost position at the peak phase. Then, the correlation values P again return to the origin O, leaving substantially closed curved trace.

Figure 8A:
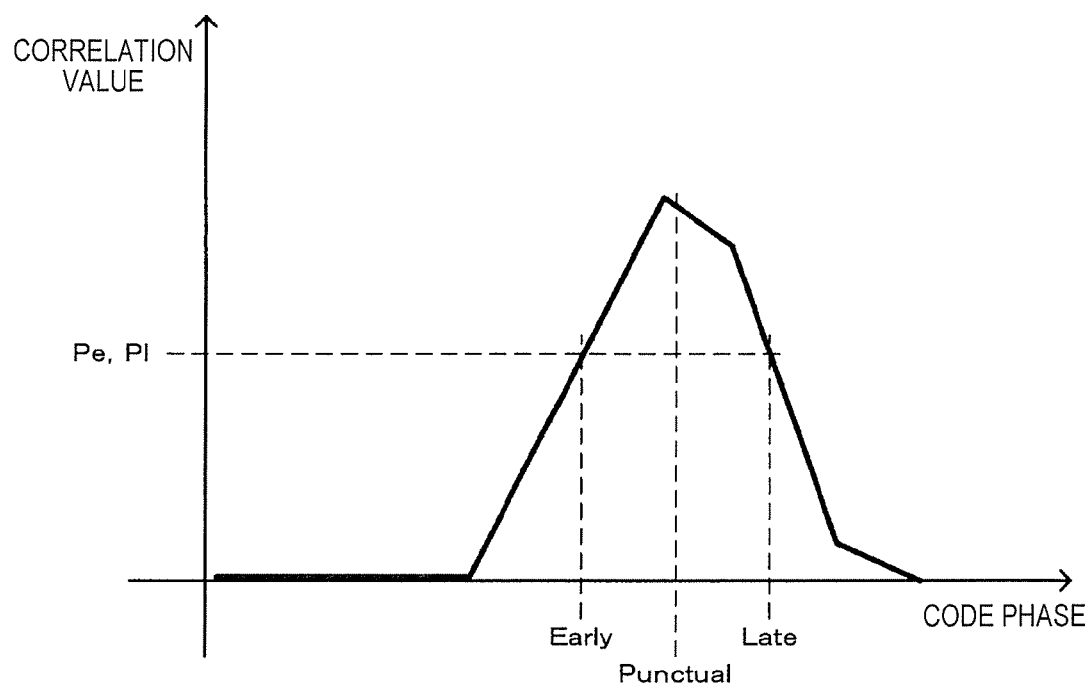
FIGS. 8A and 8B show definition of vector angle.
Figure 8B:
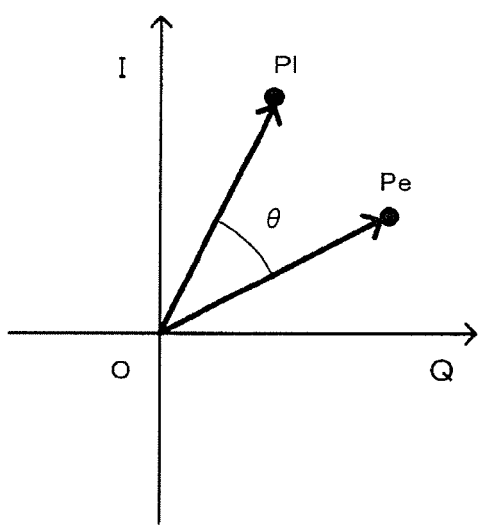

FIGS. 8A and 8B show the early and late correlation values P of the multipath signal correlation values P plotted on the IQ coordinate plane. FIG. 8A shows correlation values of the multipath signal, and FIG. 8B shows the correlation values at the respective phases shown in FIG. 8A plotted on the IQ coordinate plane. In FIG. 8B, position vector directed from the origin O toward the position of the early correlation value Pe is referred to as "early correlation vector", and position vector directed toward the position of the late correlation value P1 is referred to as "late correlation vector". An angle θ formed by the early correlation vector and the late correlation vector is defined as "vector angle". Since the correlation values P1 and P2 are equal to each other, the lengths of the early correlation vector and the late correlation vector are similarly equal to each other.

Figure 9:
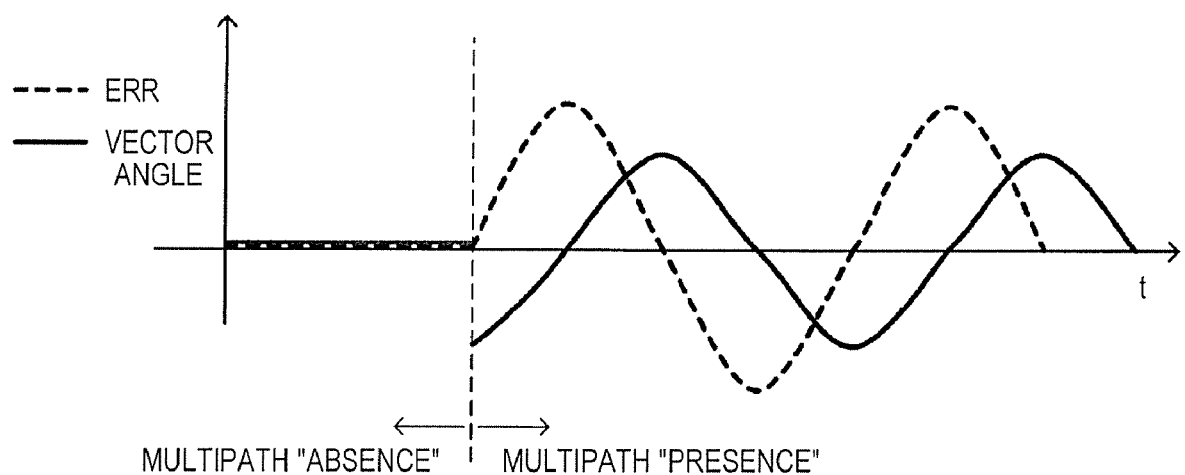
FIG. 9 shows the relationship between the vector angle and the error ERR.

The following relationship between the vector angle and the error ERR holds. FIG. 9 shows the relationship between the vector angle and the error ERR when the condition of the effect of the multipath shifts from "presence" to "absence". In this figure having the horizontal axis as a common time axis, a solid line indicates the vector angle with elapse of time, and a broken line indicates the error ERR with elapse of time.

Under the "absence" condition of the effect of the multipath, the reception signals are only direct wave signals. In this case, the error ERR is zero, and the vector angle is a constant value (theoretically zero). This is because the correlation values P are distributed along a substantially linear track on the IQ coordinate plane as shown in FIGS. 6A and 6B. Theoretically, the early correlation value is equal to the late correlation value in the direct wave signal, and thus the vector angle becomes zero. In actual situation, however, correlation is calculated while shifting phase by predetermined phase width. Thus, the vector angle becomes a constant value determined according to the performance of the hardware.

On the other hand, under the "presence" condition of the effect of multipath, the reception signals are multipath signals, and the error ERR and the vector angle vary with elapse of time. The variations in the vector angle can be approximated by sin waves, and the amplitude is determined according to the relationship between direct wave signal and indirect wave signal and difference of carrier wave frequencies. Also, under the "presence" condition of the effect of multipath, the vector angle comes closer to the "absence" condition of the effect of multipath (constant value close to zero) as the error ERR becomes larger. On the contrary, the vector angle becomes larger as the error ERR becomes smaller.

It is judged whether the reception signal is multipath signal or not based on the relationships between the PE value and the error ERR and between the vector angle and the error ERR. When the error ERR is sufficiently large, the reception signal is judged as multipath signal.

Figure 10:
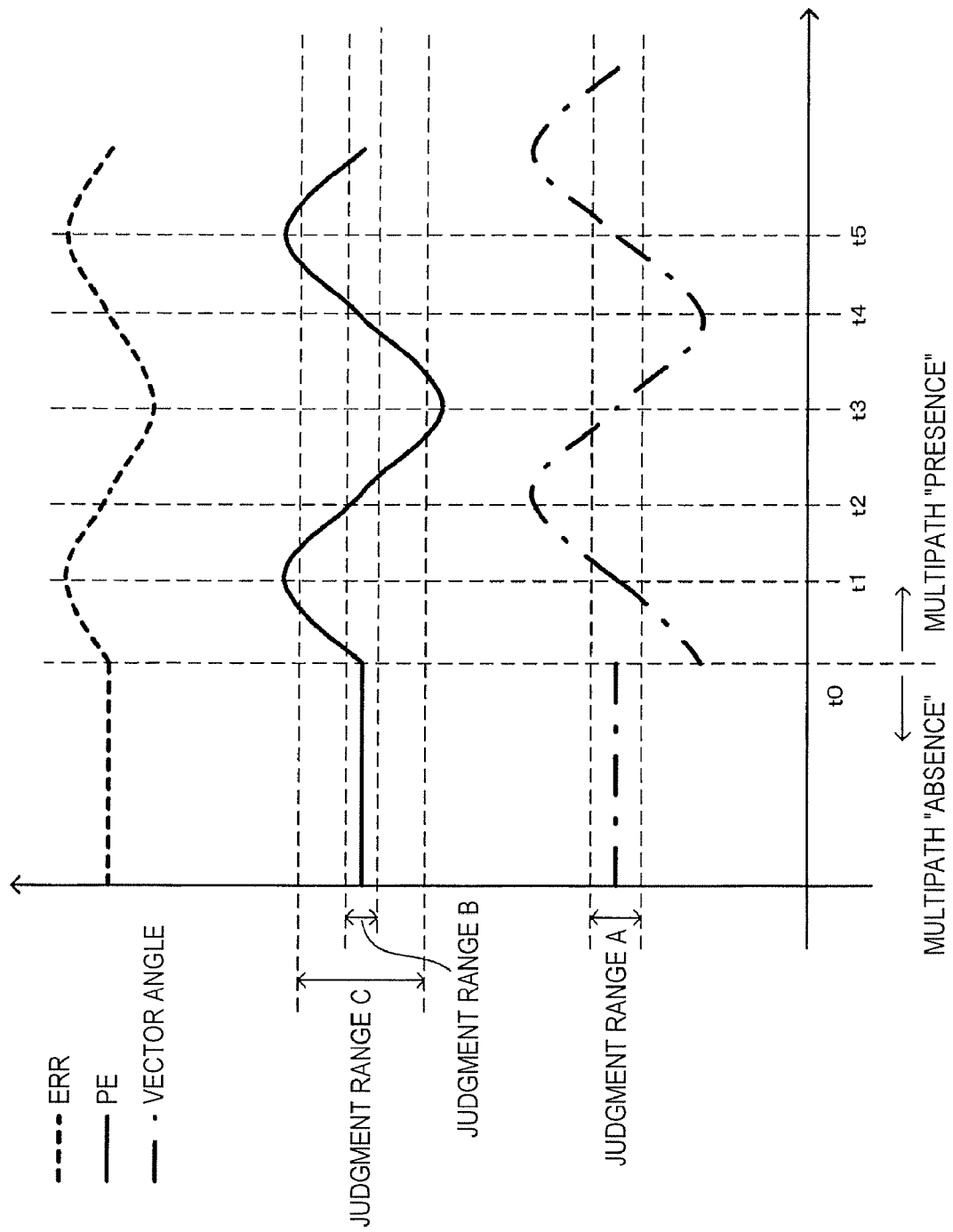
FIG. 10 shows judgment whether a reception signal is multipath signal or not.

More specifically, as shown in FIG. 10, judgment ranges are determined for the PE value and the vector angle. This figure shows the error ERR, the PE value, and the vector angle with elapse of time when the multipath effect shifts from "absence" condition to "presence" condition. In the figure having the horizontal axis as a common time axis, a broken line indicates the error ERR with elapse of time, a solid line indicates the PE value with elapse of time, and an alternate long and short dash line indicates the vector angle with elapse of time.

As shown in the figure, judgment ranges B and C are determined for the PE value. The judgment ranges B and C have a common center value, and this center value is equal to the PE value of the reception signal constituted by only direct wave signal (that is, a predetermined value according to C/A codes contained in direct wave signal). The width of the judgment range C is so determined as to be larger than the judgment range B. The PE value of the direct wave signal differs according to C/A codes of the GPS satellite signal contained in the corresponding direct wave signal. Thus, the center value of the judgment ranges B and C differs according to the GPS satellite as capture target. A judgment range A is determined for the vector angle. The center value of the judgment range A is equal to the value of vector angle when the reception signal is constituted by direct wave signal.

It is judged that the reception signal is multipath signal when at least either "Condition A: the PE value is out of the judgment range B and the vector angle is out of the judgment range A", or "Condition B: the PE value is out of the judgment range C" is satisfied. It is thus judged that the reception signal is not multipath signal when neither of these conditions is satisfied. The reason for these judgments is as follows.

Under the "absence" condition of the effect of multipath, the PE value becomes a constant value according to the capture target satellite, and the vector angle becomes a constant value (theoretically zero). That is, neither "Condition A" and "Condition B" is satisfied, and the reception signal is not judged as multipath signal. On the other hand, under the "presence" condition of the effect of multipath, the PE value varies approximately in the same manner as the variation of the error ERR. Also, the absolute value of the vector angle decreases as the absolute value of the error ERR increases, and increases as the absolute value of the error ERR decreases. Thus, depending on the relationship between the error ERR and the vector angle, there is a case where "Condition A" is not satisfied even when the reception signal is multipath signal. In the example shown in the figure, "Condition A" is not satisfied but the absolute value of the error ERR is large during the respective periods around the time t1, t3, and t5. In this case, the reception signal is judged as multipath signal under "Condition B" regardless of the value of the vector angle when the PE value is large to some extent.

(B) Correction of Error ERR

Correction of code phase when the reception signal is judged as multipath signal is now explained. As can be seen from FIG. 5, the variations in the PE value and the error ERR with elapse of time (variation direction) substantially coincide with each other. Thus, the error ERR can be calculated according to the following equation (2).

$$ERR = (PE - \text{Offset})/k \quad (2)$$

As discussed above, the PE value of the direct wave signal differs according to PRN codes of the GPS satellite signal. The "Offset" in the equation (2) shown above is an offset value for adjusting the PE value which differs according each PRN code. The value "k" is a coefficient for scale conversion. As shown in FIG. 3, the actual peak phase can be obtained by advancing the punctual phase as the code phase acquired by signal tracking by the amount of the error ERR.

Structure

Figure 11:
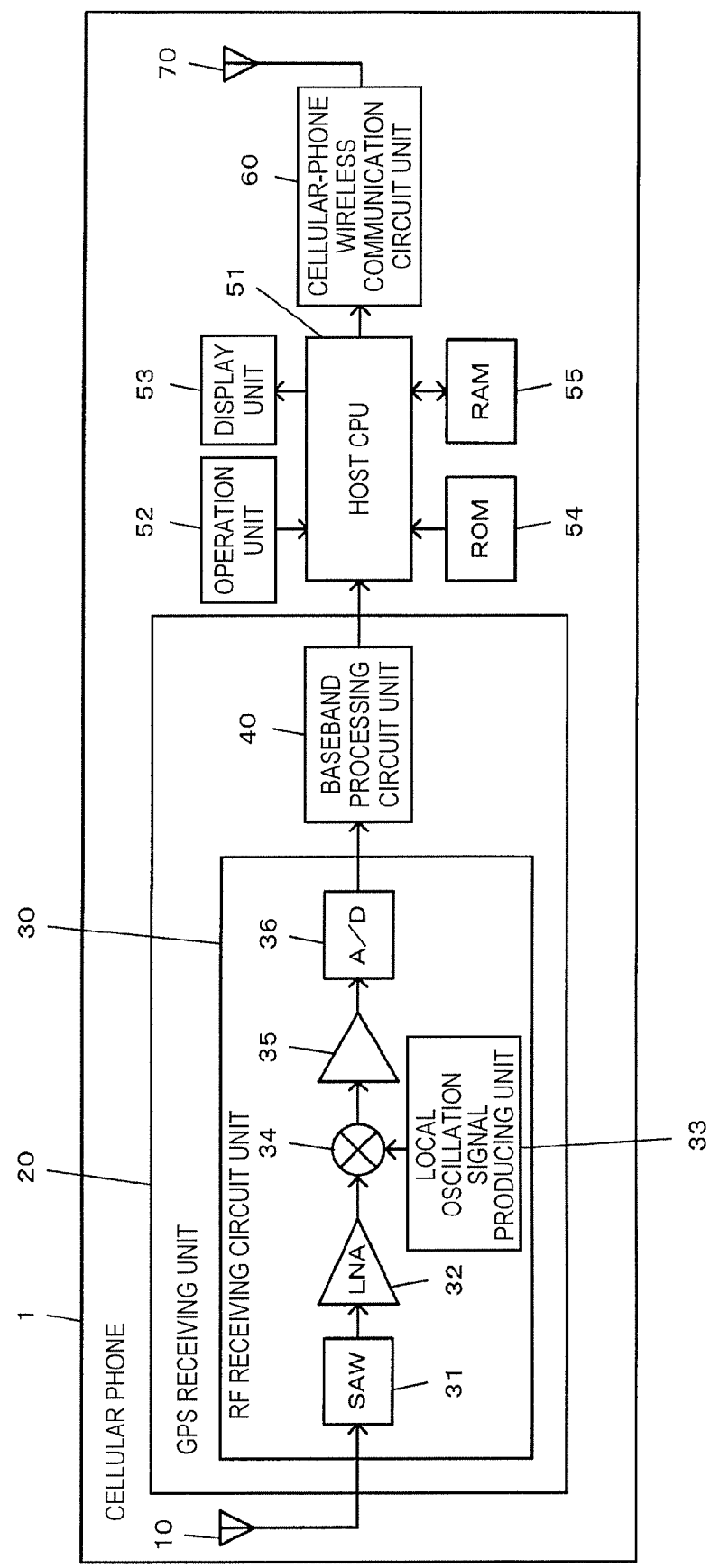
FIG. 11 shows an internal structure of a cellular phone.

FIG. 11 is a block diagram showing the internal structure of a cellular phone 1 as a GPS receiving device. As shown in the figure, the cellular phone 1 includes a GPS antenna 10, a GPS receiving unit 20, a host CPU (central processing unit) 51, an operation unit 52, a display unit 53, a ROM (read only memory) 54, a RAM (random access memory) 55, a cellular-phone wireless communication circuit unit 60, and a cellular-phone antenna 70.

The GPS antenna 10 is an antenna which receives RF (radio frequency) signal containing GPS satellite signal transmitted from a GPS satellite. The GPS satellite signal is a signal spectrum-modulated by C/A codes as PRN codes, and superimposed on carrier waves in L1 band having carrier wave frequency of 1.57542 [GHz].

The GPS receiving unit 20 captures and extracts the GPS satellite signal from the RF signal received by the GPS antenna 10, and performs position measurement calculation based on navigation message or the like extracted from the GPS satellite signal to calculate the current position. The GPS receiving unit 20 has an RF receiving circuit unit 30 and a baseband processing circuit unit 40.

The RF receiving circuit unit 30 has an SAW (surface acoustic wave) filter 31, an LNA (low noise amplifier) 32, a local oscillation signal producing unit 33, a multiplying unit 34, an amplifying unit 35, and an A/D converting unit 36. The RF receiving circuit unit 30 receives signals by so-called super-heterodyne system.

The SAW filter 31 is a band-pass filter which transmits signals in a predetermined band range included in the RF signal inputted from the GPS antenna 10, and blocks and outputs frequency components out of the band range. The LNA 32 is a low-noise amplifier which amplifies signals inputted from the SAW filter 31 and outputs the amplified signals. The local oscillation signal producing unit 33 is constituted by an oscillator such as LO (local oscillator) and outputs local oscillation signals. The multiplying unit 34 has a multiplier which combines a plurality of signals, and down-converts the RF signal inputted from the LNA 32 by multiplying (combining) the RF signal by the local oscillation signal produced by the local oscillation signal producing unit 33 into an intermediate frequency signal (IF signal). Though not shown in the figure, in the multiplying unit 34, the reception signal is down-converted into the IF signal by multiplying the RF signal by local oscillation signals whose phases are shifted by 90 degrees from one another, and separated into the same phase component (I signal) and the orthogonal component (Q signal). The amplifying unit 35 amplifies the IF signal (I signal and Q signal) inputted from the multiplying unit 34 at a predetermined amplification rate. The A/D converting unit 36 converts the signal (analog signal) inputted from the amplifying unit 35 into digital signal. Thus, the RF receiving circuit unit 30 outputs the I signal and Q signal of the IF signal.

Figures 12, 13:
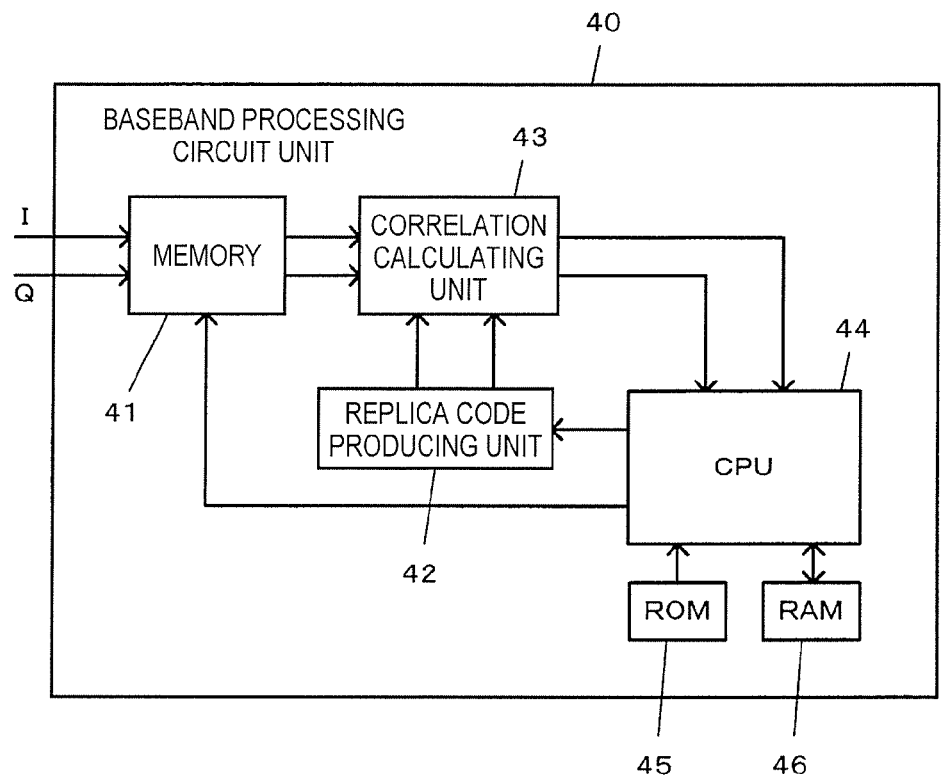
FIG. 12 shows a circuit structure of a baseband processing circuit unit.
FIG. 13 shows an example of data structure of flag judgment range table.

The baseband processing circuit unit 40 captures and tracks the GPS satellite signal from the IF signal inputted from the RF receiving circuit unit 30 to perform pseudo distance calculation and position measurement calculation based on the navigation message, time information and the like extracted from the decoded data. FIG. 12 illustrates the circuit structure of the baseband processing circuit unit 40. As shown in this figure, the baseband processing circuit unit 40 has a memory 41, a replica code producing unit 42, a correlation calculating unit 43, a CPU 44, an ROM 45, and an RAM 46.

The memory 41 samples the I signal and Q signal of the IF signal inputted from the RF receiving circuit unit 30 at predetermined time intervals, and stores the sampled signals. The replica code producing unit 42 produces and outputs replica codes (replica signal) simulating PRN codes of the GPS satellite signal from the GPS satellite as the capture target. The correlation calculating unit 43 performs correlation calculation between the sampling data of the I signal and Q signal of the IF signal stored in the memory 41 and the replica codes inputted from the replica code producing unit 42 while shifting the phase of the replica codes.

The CPU 44 collectively controls the respective sections of the baseband processing circuit unit 40, and performs various calculations containing baseband processing. In the baseband processing, the CPU 44 produces replica codes corresponding to C/A codes of the GPS satellite signal as the capture target. Then, the CPU 44 detects the C/A codes and the code phase contained in the GPS satellite signal based on the correlation calculation result (correlation value) obtained by the correlation calculating unit 43 to capture and track the GPS satellite signal. For tracking the GPS satellite signal, the correlation value of the phase currently tracked (punctual phase) is varied such that the late correlation value agrees with the early correlation value. The data of the GPS satellite successively captured (such as satellite number) is stored in capture satellite data 461.

Measurement information for positioning calculation is determined based on the correlation result of the reception signal. The measurement information is information about the reception signal used in position measurement calculation performed by the CPU 44, and contains information on reception frequency and code phase. The measurement information is stored in measurement information 462.

Then, the CPU 44 performs multipath judging process for judging whether the reception signal from the captured GPS satellite is multipath signal. In the multipath judging process, the PE value is initially calculated. More specifically, as discussed with reference to FIG. 4, the correlation value Pp of the code phase (punctual phase) currently tracked, the correlation value Pa at the phase advanced from the punctual phase by 2/3 chip, and the correlation value Pn advanced from the punctual phase by 1 chip or more are obtained. Then, the PE value is calculated according to equation (1).

The CPU 44 also calculates the vector angle. More specifically, as discussed with reference to FIGS. 8A and 8B, the late correlation value and the early correlation value are plotted on the IQ coordinate plane, and the angle θ formed by the late correlation vector directed from the origin O toward the position of the late correlation value and the early correlation vector directed toward the position of the early correlation value is determined as "vector angle".

Then, flags F1 through F3 are determined by comparing the calculated PE value and vector angle with the predetermined judgment ranges A through C. More specifically, the PE value is compared with the judgment ranges B and C. Subsequently, the flag F2 is set at "1" when the PE value is out of the judgment range B and the flag F3 is set at "1" when the PE value is out of the judgment range C. The Vector angle is compared with the judgment range A, and the flag F1 is set at "1" when the vector angle is out of the judgment range A. The flags F1 through F3 have the initial value "0". The set values of the flags F1 through F3 are stored in flag data 463.

The judgment ranges A through C are defined in flag judgment range table 452. FIG. 13 shows an example of data structure of the flag judgment range table 452. The flag judgment range table 452 stores the respective center values of the judgment ranges A through C and the widths from each center value as reference in the positive direction and negative direction in correspondence with the respective center values for each GPS satellite.

The CPU 44 judges whether the reception signal is multipath signal or not based on the combinations of the set values of the flags F1 through F3. More specifically, the CPU 44 judges that the reception signal is multipath signal when at least either "Condition A: both the flags F1 and F2 are "1" or "condition B: the flag F3 is "1" is satisfied, and judges that the reception signal is not multipath signal when neither of these conditions are satisfied.

When it is judged that the reception signal is multipath signal by this multipath judgment process, error correction process is performed. In the error correction process, the error ERR at the code phase is calculated according to equation (2) based on the PE value calculated by the multipath judgment process. In this case, the error ERR is calculated using PE Offset according to the capture target satellite with reference to PE offset table 453.

The PE offset table is data table which defines the PE Offsets of the respective GPS satellites. FIG. 14 shows an example of data structure of the PE offset table 453. The PE offset table 453 stores the PE Offset for each GPS satellite in correspondence therewith.

After the error ERR is calculated, the CPU 44 advances the code phase by the amount of the calculated error ERR to correct measurement information about the captured GPS satellite. Then, data of the captured GPS satellite signal is decoded based on the corrected measurement information to extract navigation message and perform position measurement calculation for measuring the current position of the cellular phone 1 by calculating the pseudo distance. The calculated measurement position is stored in measurement result data 464.

The ROM 45 stores system programs for controlling the respective sections of the baseband processing circuit unit 40 and the RF receiving circuit unit 30, and various programs and data for performing various processes including baseband process and the like. FIG. 15 shows the structure of ROM 45. As can be seen from this figure, the program stores baseband program 451 for performing baseband process as program, and the flag judgment range table 452 and the PE offset table 453 as data.

The RAM 46 is used as the operation area of the CPU 44, and temporarily stores programs and data read from the ROM 45, calculation results calculated by the CPU 44 according to various programs and the like. FIG. 16 shows the structure of the RAM 46. As can be seen from this figure, the RAM 46 stores the capture satellite data 461, the measurement information 462, the flag data 463, and the measurement result data 464.

Returning to FIG. 11, the host CPU 51 collectively controls the respective sections of the cellular phone 1 according to various types of programs such as the system program stored in the ROM 54. More specifically, the host CPU 51 chiefly performs processes for providing call function as telephone, and other various functions including navigation function for displaying navigation screen on the display unit 53 where the current position of the cellular phone 1 inputted from the baseband processing circuit 40 is plotted on a map.

The operation unit 52 is an input device constituted by operation keys and button switches to output operation signals to the host CPU 51 according to operation of the user. Various commands such as start or end command of position measurement are inputted by the operation of the operation unit 52. The display unit 53 is a display device constituted by LCD (liquid crystal display) and the like to display a display screen (such as navigation screen and time information) based on a display signal inputted from the host CPU 51.

The ROM 54 stores the system program for controlling the cellular phone 1 under the control of the host CPU 51, and various programs and data for providing navigation function and others. The ROM 55 is used as the operation area of the host CPU 51, and temporarily stores program and data read from the ROM 54, data inputted from the operation unit 52, calculation results performed by the host CPU 51 according to various programs.

The cellular-phone wireless communication circuit unit 60 is a communication circuit unit for cellular phone including RF conversion circuit, baseband processing circuit, and the like to transmit and receive wireless signals under the control of the host CPU 51. The cellular-phone antenna 70 is an antenna for transmitting and receiving cellular-phone wireless signals to and from a wireless base station provided by a communication service provider of the cellular phone 1.

Flow of Process

Figure 17:
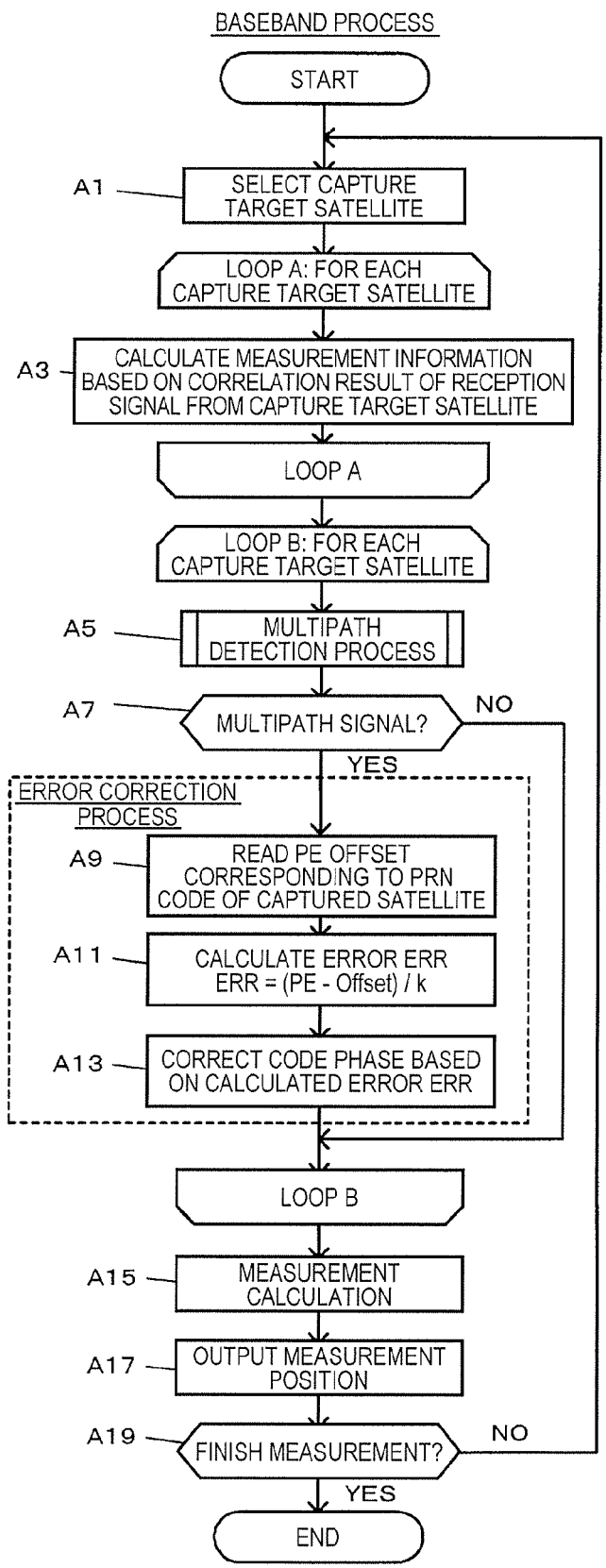
FIG. 17 is a flowchart of baseband process.

FIG. 17 is a flowchart showing the flow of the baseband process performed by the CPU 44. As shown in this figure, the CPU 44 initially selects capture target satellites based on track information on GPU satellite such as Almanac (step A1). Then, the CPU 44 performs the process of Loop A for the selected capture target of the respective satellites.

In Loop A, the replica code producing unit 42 produces replica codes of C/A codes associated with the capture target satellites, and calculate measurement information for position measuring calculation based on correlation calculation results of reception signals from the capture target satellites inputted from the correlation calculating unit 43 (step A3). More specifically, the receiving frequency and phase at which the correlation value becomes the peak correlation value are specified and defined as measurement information of the capture target satellites. After the process of Loop A is finished for all the capture target satellites, the process of Loop B is performed for the captured GPS satellites (captured satellites). In Loop B, multipath detection process for judging whether the reception signals from the target captured satellites are multipath signals or not (step A5).

Figure 18:
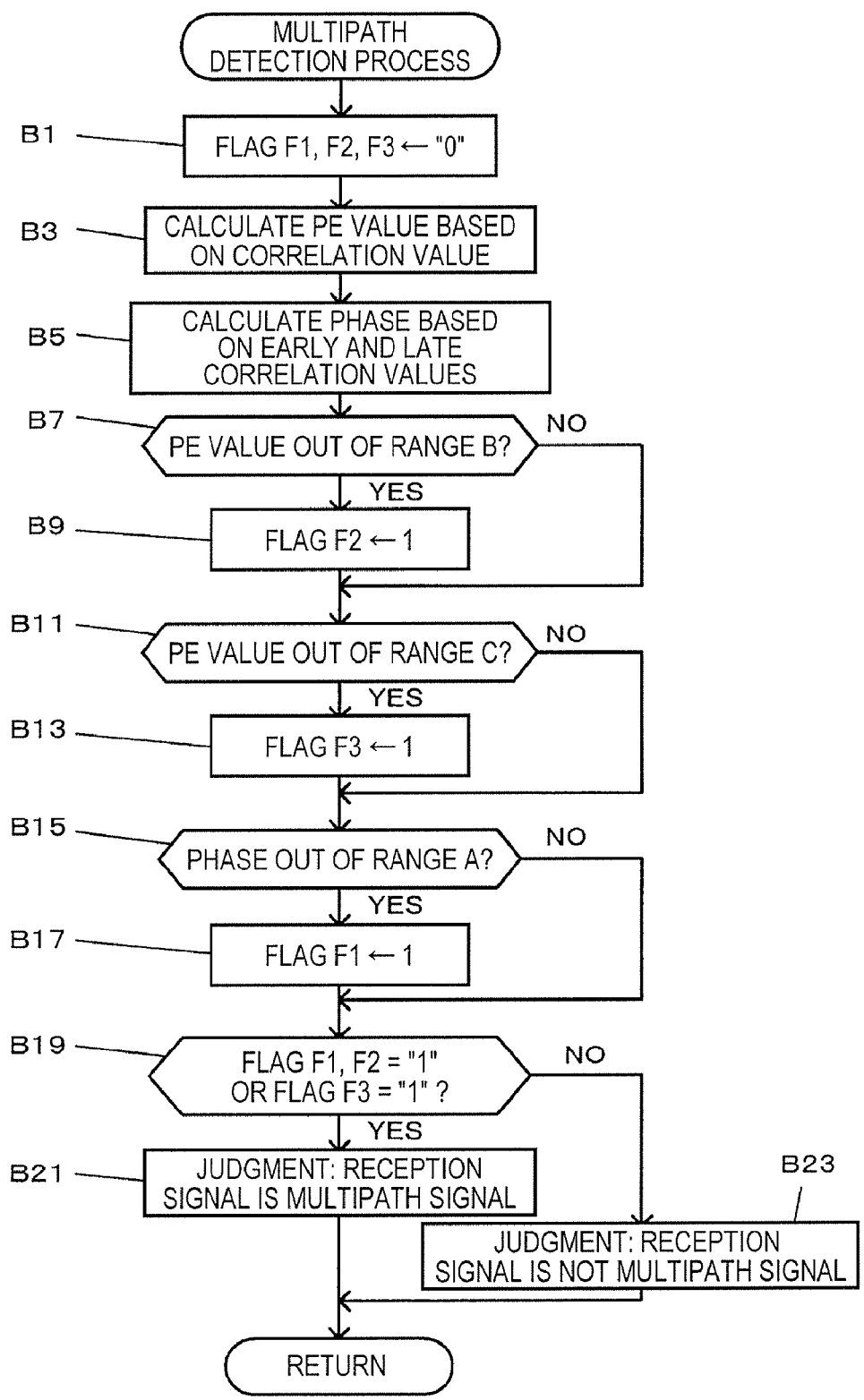
FIG. 18 is a flowchart of multipath detection process performed during the baseband processing.

FIG. 18 is a flowchart showing the multipath detection process. As shown in this figure, the CPU 44 provides initial setting of "0" for all the flags F1 through F3 (step B1). Then, the CPU 44 calculates PE values based on the correlation results of the reception signals from the target captured satellites inputted from the correlation calculating unit 43 (step B3). Also, the CPU 44 calculates vector angles based on early correlation values and late correlation values inputted from the correlation calculating unit 43 (step B5).

Subsequently, the CPU 44 compares the calculated PE values with the predetermined judgment ranges B and C with reference to the flag judgment range table 452. When the PE value is out of the judgment range B (step B7: YES), the CPU 44 sets the flag F2 at "1" (step B9). When the PE value is out of the judgment range C (step B11: YES), the CPU 44 sets the flag F3 at "1" (step B13). Also, the CPU compares the vector angles with the predetermined judgment range A. When the vector angle is out of the judgment range A (step B15: YES), the CPU 44 sets the flag F1 at "1" (step B17).

Next, the CPU 44 judges whether the reception signals from the target captured satellites are multipath signals or not based on the set values of the flags F1 through F3. More specifically, when at least either Condition A: both flags F1 and F2 are "1" or Condition B: flag F3 is "1" is satisfied (step B19: YES), it is judged that the reception signal is multipath signal (step B21). When neither of these conditions are satisfied (step B19: NO), it is judged that the reception signal is not multipath signal (step B23). After these processes, the multipath detection process ends.

When it is judged that the reception signal is multipath signal as a result of the multipath detection process (step A7: YES), error correction process for correcting errors in the measurement information is performed. More specifically, the CPU 44 reads PE Offset corresponding to the PRN codes of the target captured satellite with reference to the PE offset table 453 (step A9), and calculates error ERR according to equation (1) based on the PE Offset thus read and the PE value of the target captured satellite (step A11). Then, the code phase is advanced by the amount of the calculated error ERR to correct the measurement information of the target captured satellite (step A13).

When the process in Loop B for all the target captured satellites is finished, the CPU 44 performs position measuring calculation for calculating the current position of the cellular phone 1 using the measurement information on the respective captured satellites (step A15) and outputs the calculated measurement positions to the host CPU 51 (step A17). Then, it is judged whether the position measurement is finished or not.

When the process is not finished (step A19: NO), the process returns to step A1. When the process is finished (step A19: YES), the baseband process ends.

Operation and Advantage

According to this embodiment, the "PE value" as the ratio of the correlation value at the punctual phase to the correlation value at the phase advanced from the punctual phase by N (0<N<1) chip is calculated based on the correlation calculation result of the reception signal. Also, the "vector angle" as the angle formed by the position vectors directed toward the early correlation value and the late correlation value from the origin O when the early correlation value and the late correlation value are plotted on the IQ coordinate plane is calculated. Then, it is determined whether the reception signal is multipath signal based on the judgment results whether the PE value is inside or outside of the judgment ranges B and C and whether the vector angle is inside or outside of the judgment range A. When the reception signal is determined as multipath signal, the error ERR is calculated to correct the code phase appropriately. As a result, the position measurement accuracy can be enhanced even when the cellular phone 1 is positioned in the multipath environment.

MODIFIED EXAMPLE

The invention is not limited to the embodiment described and depicted herein, but may be practiced otherwise without departing from the scope and spirit of the invention.

(A) Judgment of Multipath Signal

For example, the reception signal is judged as multipath signal when at least one of the two conditions (Conditions A and B) is satisfied in this embodiment. However, only one of these conditions may be used for this judgment. In this case, the ranges of the judgment ranges A, B and C may be widened or narrowed.

(B) Electronic Device

In this embodiment, the example of the cellular phone having the GPS function has been discussed. However, the invention is similarly applicable to other electronic device such as portable navigation device, car navigation system, PDA (personal digital assistants), and watch.

(C) Applicable System

While the system using GPS has been discussed in this embodiment, the invention is similarly applicable to other satellite positioning systems such as GALILEO using CDMA system similarly to the GPS system. Moreover, the invention is applicable to systems which transmit signals modulated by direct spectrum spread system such as system which uses wireless LAN wireless signals conforming with IEEE802.11b standard as positioning signals.

What is claimed is:

1. A multipath signal judging method comprising:
   receiving positioning signal modulated in a spread code;
   performing correlation calculation for I and Q components for a reception signal as a positioning signal modulated in a spread code and a replica code, the I component being same phase component with the received positioning signal, the Q component being orthogonal component of the received positioning signal;
   judging code phase based on the correlation calculation;
   calculating an angle formed by position vectors of correlation values at an early phase plotted on IQ coordinates and a second position vector of a correlation value at a late phase plotted on the IQ coordinates, the early phase being an advanced phase from the code phase by N chip (0<N<1), the late phase being a delayed phase from the code phase by N chip (0<N<1); and
   judging that the reception signal is not multipath signal when the angle is within a predetermined angle.

2. A multipath signal judging method according to claim 1, further comprising:
   calculating a ratio of a first difference to a second difference, the first difference being a first correlation value minus a third correlation value, the second difference being a second correlation value minus the third correlation value, the first correlation value as correlation value at the code phase, the second correlation value as correlation value at a phase shifted from the code phase by X chip ($0 \leq X \leq 1$), and the third correlation value as correlation value at a phase shifted from the code phase by Y chip (1<Y); wherein,
   the judging of whether the reception signal is multipath signal judges whether the reception signal is multipath signal using the angle and the ratio.

3. The multipath signal judging method according to claim 2, wherein,
   the judging that the reception signal is not the multipath signal when the angle is within the predetermined angle including
      judging whether the angle exceeds a predetermined angle variation width or not;
      judging whether the ratio exceeds a predetermined ratio variation width or not; and
      judging that the reception signal is the multipath signal when the angle exceeds the predetermined angle variation width and when the ratio exceeds the predetermined ratio variation width.

4. The multipath signal judging method according to claim 2, wherein:
   the positioning signal is transmitted from a positioning satellite and has a different spread code for each of the positioning satellite; and
   either or both of the predetermined angle variation width and the predetermined ratio variation width are changed for each of the positioning satellite.

5. The multipath signal judging method according to claim 2, wherein,
   the judging that the reception signal is not the multipath signal when the angle is within the predetermined angle including
      judging whether the angle exceeds a predetermined angle variation width or not;
      judging whether the ratio exceeds a first ratio variation width or not;
      judging whether the ratio exceeds a second ratio variation width having threshold condition wider than the first ratio variation width or not; and
      judging that the reception signal is the multipath signal 1) when the angle exceeds the predetermined angle variation width and when the ratio exceeds the first ratio variation width, or 2) when the ratio exceeds the second ratio variation width.

6. The multipath signal judging method according to claim 5, wherein:
   the positioning signal is transmitted from a positioning satellite and has a different spread code for each of the positioning satellite; and
   at least one of the predetermined angle variation width, the first ratio variation width, and the second ratio variation width is changed for each of the positioning satellite.

7. A multipath signal judging method comprising:
   receiving positioning signal modulated in a spread code;
   performing correlation calculation for I and Q components of a reception signal as a positioning signal modulated in a spread code and a replica code, the I component being same phase component with the received positioning signal, the Q component being orthogonal component of the received positioning signal;

judging code phase based on the correlation calculation;

calculation a ratio of a first difference to a second difference, the first difference being a first correlation value minus a third correlation value, the second difference being a second correlation value minus the third correlation value, the first correlation value as correlation value at the code phase, the second correlation value as correlation value at a phase shifted from the code phase by X chip ($0<X<1$), and the third correlation value as correlation value at a phase shifted from the code phase by Y chip ($1<Y$); and judging that the reception signal is multipath signal when the ratio exceeds a predetermined ratio variation width.

8. A computer-readable-medium stored a program under which a processor contained in a positioning device performs the multipath signal judgment method according to claim 1.

* * * * *